United States Patent [19]

Gaul

[11] Patent Number: 5,156,031

[45] Date of Patent: Oct. 20, 1992

[54] BICYCLE SEAT SECURITY ATTACHMENT

[76] Inventor: Richard K. Gaul, 1901B E. Washington St., Urbana, Ill. 61801

[21] Appl. No.: 590,128

[22] Filed: Sep. 28, 1990

[51] Int. Cl.$^5$ .......................... B62H 5/00; E05B 71/00
[52] U.S. Cl. ..................................... 70/233; 280/220; 280/287; 280/288.4
[58] Field of Search ..................... 280/220, 287, 288.4; 70/233, 234, 235, 236, 14; 224/30 R, 275

[56] References Cited

FOREIGN PATENT DOCUMENTS

| 845614 | 8/1952 | Fed. Rep. of Germany | 280/287 |
| 3335662 | 4/1985 | Fed. Rep. of Germany | 70/234 |
| 456840 | 4/1950 | Italy | 280/287 |

Primary Examiner—Mitchell J. Hill
Attorney, Agent, or Firm—Sixbey, Friedman, Leedom & Ferguson

[57] ABSTRACT

The bicycle seat security device is secured to the seat post of a bicycle seat and operates to receive a bicycle lock. With the bicycle lock in place, the bicycle seat security device prevents access to a seat retaining bolt which is mounted in the bicycle seat security device. This device includes a lock retaining section having a lock bore extending therethrough to receive a bicycle lock with a fastener receiving opening formed in the lock retaining section and extending therethrough to the lock bore. The fastener receiving opening is sized to permit passage of the seat retaining bolt which is mounted in a mounting unit formed on the lock retaining section on the side of the lock bore opposite to the fastener receiving opening.

18 Claims, 4 Drawing Sheets

BICYCLE SEAT SECURITY ATTACHMENT

TECHNICAL FIELD

This invention relates to a security device attachable to a bicycle seat to reduce the likelihood of theft of the seat while the bicycle is not in use. Specifically, the invention includes an attachment which is adaptable to a bicycle lock to secure the bicycle seat while the bicycle is left unattended.

BACKGROUND ART

Bicycling has become a very popular form of recreation in the past decade as both a sport and means of exercise for professional riders and amateurs alike. Due to the increase in demand, bicycle manufacturers have emerged with ever more specialized forms of equipment which have become very expensive. Therefore, bicycles of today are becoming increasingly susceptible to theft because of their great value. As a result of this, very sophisticated locks have been designed replacing the old chain type lock to provide greater protection from theft.

One bicycle component which has become more advanced is the bicycle seat. It has been recognized that in a racing situation, it is important to be able to quickly remove the seat. Based on this requirement, many bicycles are equipped with quick release devices to allow the seat, as well as the wheels to be quickly and easily removed. However, these quick release devices also allow quick and easy theft of seats and wheels which are left unattended. Special bicycle locks have been developed which allow a quick release wheel to be removed from its corresponding forks and locked together with the bicycle frame and remaining wheel for adequate protection from theft.

Bicycle seats are presently not designed to be locked with the frame and wheels when a cyclist locks the bicycle. Therefore, to prevent theft of the seat, the cyclist is now required to remove the quick release seat and take it away from the bicycle. This may be inconvenient and may also result in loss due to inadvertent misplacement.

The increasing cost of currently designed bicycle seats makes it necessary and important to provide some means of protecting bicycle seats from theft while reducing any added inconvenience to the cyclist.

SUMMARY OF THE INVENTION

It is a primary object of the present invention provide a bicycle seat security device to reduce the likelihood of theft of a bicycle seat.

Another object of the present invention is to provide a bicycle seat security device which is adapted for use with conventional bicycle locks.

Yet another object of the present invention is to provide a bicycle seat security device which includes a lock receiving piece for securing the bicycle seat to the bicycle lock and a fastener for joining the lock receiving piece to the bicycle seat wherein the lock receiving piece is formed in such a way to prevent access to the fastener when the bicycle lock is received by the lock receiving piece.

Still another object of the present invention is to provide a bicycle seat security device wherein the fastener includes a head portion and a shank portion and the lock receiving piece further includes a housing to receive the head portion of the fastener so that the head portion is allowed to rotate freely therein.

Another object of the present invention is to provide a bicycle seat adapted to receive a bicycle lock for reducing the likelihood of theft of the bicycle seat wherein the bicycle seat includes a seat post which further includes a lock receiving portion formed therein for securing the bicycle seat to the bicycle lock.

These, as well as other advantages of the present invention, are accomplished by a bicycle seat security device which is readily adaptable to most bicycle seats. The security device includes a lock receiving piece connected to the seat post of the bicycle seat, and specifically, the lock receiving piece is formed such that a portion of a bicycle lock may easily be received therein. The head portion of a fastener for the bicycle seat is enclosed in a fastener receiving housing so that the lock receiving piece may freely rotate relative to the seat post for the seat. Moreover, the fastener receiving housing allows the fastener to remain inaccessible when a portion of the bicycle lock is received by the lock receiving piece. The same advantage can be recognized by a bicycle seat which includes the lock receiving piece integrally molded within the seat post of the bicycle seat.

DETAILED DESCRIPTION OF THE PREFERRED EMBODIMENT

Figure 1:
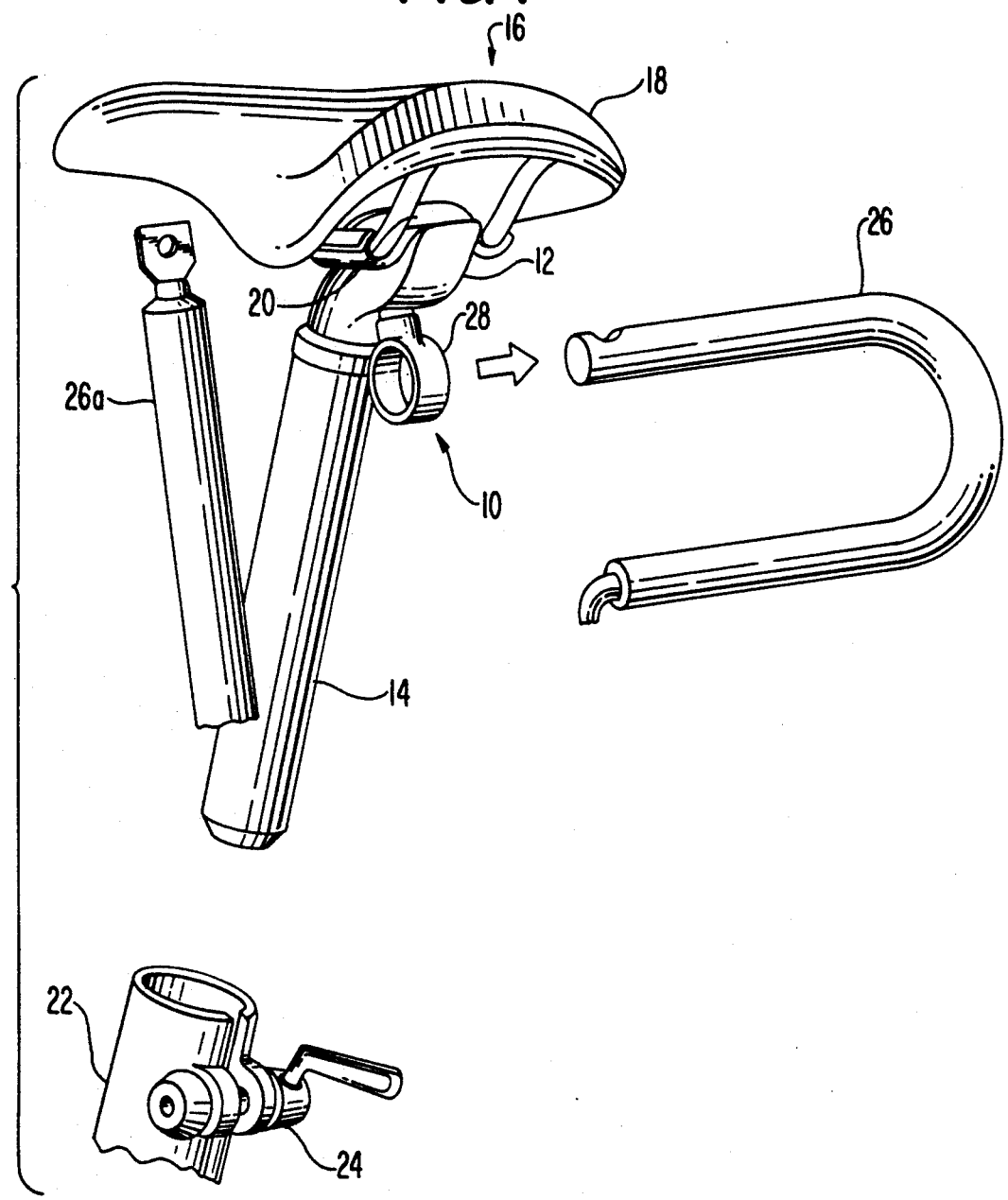
FIG. 1 is a perspective view of the bicycle seat security device of the present invention.

Referring now to FIG. 1, the bicycle seat security device of the present invention indicated generally at 10 is shown secured to the upper support section 12 for the seat post 14 of a bicycle seat assembly 16. This seat assembly includes a seat 18 connected by means of a seat frame 20 to the upper support section 12.

Bicycles now commercially available to consumers are normally equipped with quick release mechanisms for the bicycle wheels as well as for the bicycle seat assembly. Thus, the seat post 14 is normally secured within a seat post receiving section 22 of the bicycle frame by means of a quick release mechanism 24. To prevent theft of bicycle components when a bicycle is left in public unattended, durable bicycle locks such as the hoop lock 26 and 26a partially illustrated in FIG. 1, have been developed to secure the bicycle components to a bicycle rack or other support. Generally, one bicycle wheel is removed and the hoop portion of the hoop lock is passed through both bicycle wheels and the frame and is then locked to circumvent a post, bicycle rack, or other support. Although in the past, the hoop lock has operated effectively to prevent theft of most bicycle components, it has not been adapted to secure removable bicycle seats, and the bicycle seat security device 10 is designed to cooperate with a hoop lock or other similar bicycle lock to perform this function.

Figure 2:
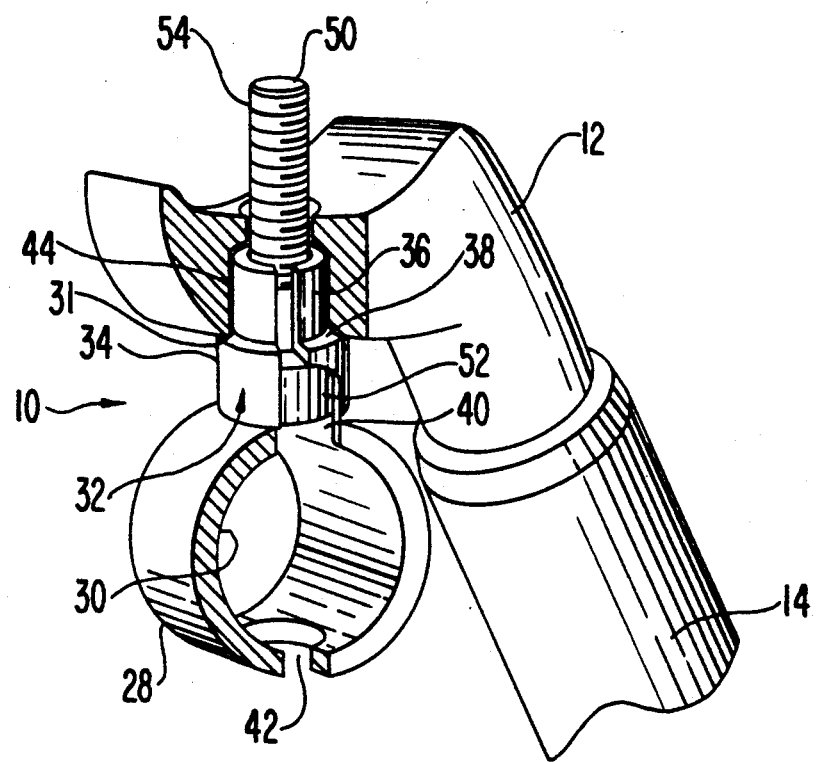
FIG. 2 is partially cut-away perspective view of the bicycle seat security device of FIG. 1 connected to a seat post for a bicycle seat.

Referring now to FIG. 2, the bicycle seat security device 10 includes a lock retaining section 27 with a lock receiving loop 28 having a central bore 30 which is adapted to receive and retain a portion of a bicycle lock, such as the hoop lock 26. Extending laterally from one side of the lock receiving loop 28 is a mounting unit 31 which includes a fastener receiving housing 32 having an enlarged cylindrical housing section 34 which opens at one end into the central bore 30. The fastener receiving housing is completed by a second smaller cylindrical housing section 36 which extends outwardly from one end of the enlarged cylindrical section 34. Since the smaller cylindrical section 36 is of reduced diameter relative to the diameter of the enlarged cylindrical section 34, an inwardly extending flange 38 is formed between the cylindrical sections 34 and 36.

The cylindrical sections 34 and 36 of the fastener receiving housing 32 define an open ended housing bore 40 having an inner end which opens into the central bore 30 and having a longitudinal axis which is substantially perpendicular to the longitudinal axis of the central bore 30. A fastener receiving opening 42 is provided in the lock receiving loop 28 coaxially with and opposite to the housing bore 40. This fastener receiving opening has a diameter substantially equal to that of the enlarged cylindrical section 34.

Figure 3:
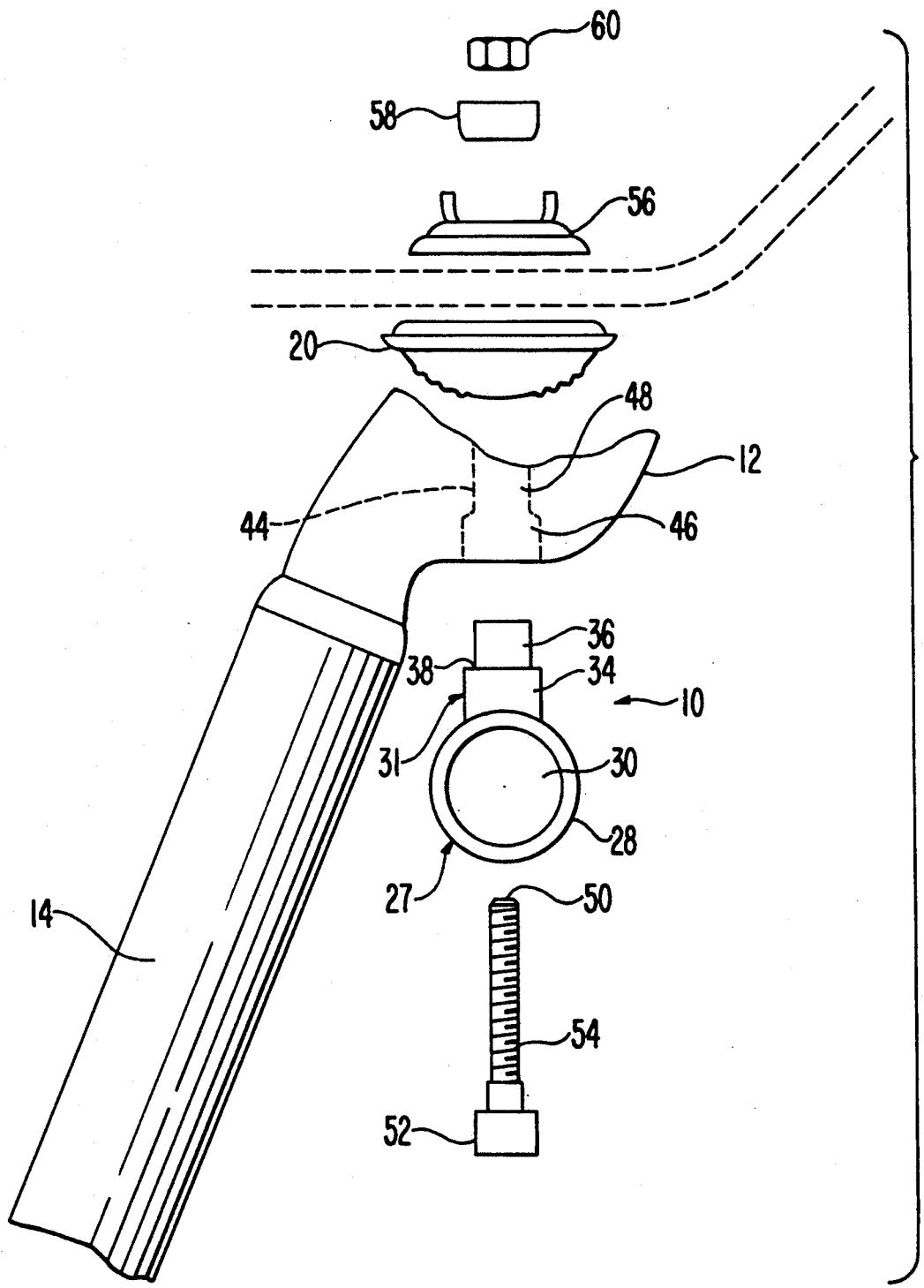
FIG. 3 is an exploded view of the bicycle seat security device before connection to the base of the bicycle seat.

In order to secure the lock receiving loop to a bicycle seat assembly, a stepped bolt receiving bore 44 is formed to extend through the upper support section 12 of the seat post. As illustrated in FIG. 3, this stepped bore includes an entrant section 46 of enlarged diameter which is adapted to receive the smaller cylindrical section 36 of the fastener receiving housing 32. The diameter of the entrant section 46 is greater than the diameter of an exit section 48 of the stepped bore, but is less than that of the enlarged cylindrical section 34 of the fastener receiving housing so that the flange 38 seats on the surface of the upper support section 12 annularly of the entrant section 46.

Once the smaller cylindrical section 36 of the fastener receiving housing 32 is seated within the entrant section 46 of the stepped bore 44, a retaining bolt 50 is inserted through the fastener receiving opening 42 and into the fastener receiving housing 32. The retaining bolt 50 has an enlarged circular head 52 with a threaded shank 54 extending outwardly therefrom. The fastener receiving opening 42 is large enough to permit the circular head 52 of the retaining bolt to pass therethrough, and the retaining bolt is inserted into the fastener receiving housing so that the head thereof is received completely within the enlarged cylindrical section 34. The shank of the retaining bolt extends through the exit section 48 and the seat frame 20 to secure the bicycle seat to the upper support section 12 of the seat post. The shank of the retaining bolt further extends into a security washer 56 which houses a washer 58 and a nut 60 that is threaded onto the shank 54. Both the washer 58 and the nut 60 are enclosed within the security washer 56 so that the nut may not be removed from the shank at this end.

When the bicycle seat security device 10 is installed on a bicycle seat, the seat may be released from the frame and one leg of the U-shaped hoop portion of the bicycle lock 26 is passed through the central bore 30 of the lock receiving loop 28. Then the bicycle lock is passed around the frame and wheels of a bicycle and is locked to a support in the normal manner. It will be noted that once the hoop lock is passed through the lock receiving loop 28 and locked, all access to the head 52 of the retaining bolt 50 is blocked by the hoop lock, and it is therefore impossible to remove the lock receiving loop from the upper support section of the seat post. Since only the flange 38 contacts the enlarged circular head of the retaining bolt 50, the lock receiving loop 28 may be pivoted relative to the retaining bolt without creating enough friction to unscrew the retaining bolt from the nut 60. If sufficient friction is developed between the flange 38 and the head 52 of the retaining bolt to permit the lock receiving loop 28 to turn the retaining bolt, then the washer 58 ensures that the nut 60 will also turn with the retaining bolt in the security washer 36.

Figure 4:
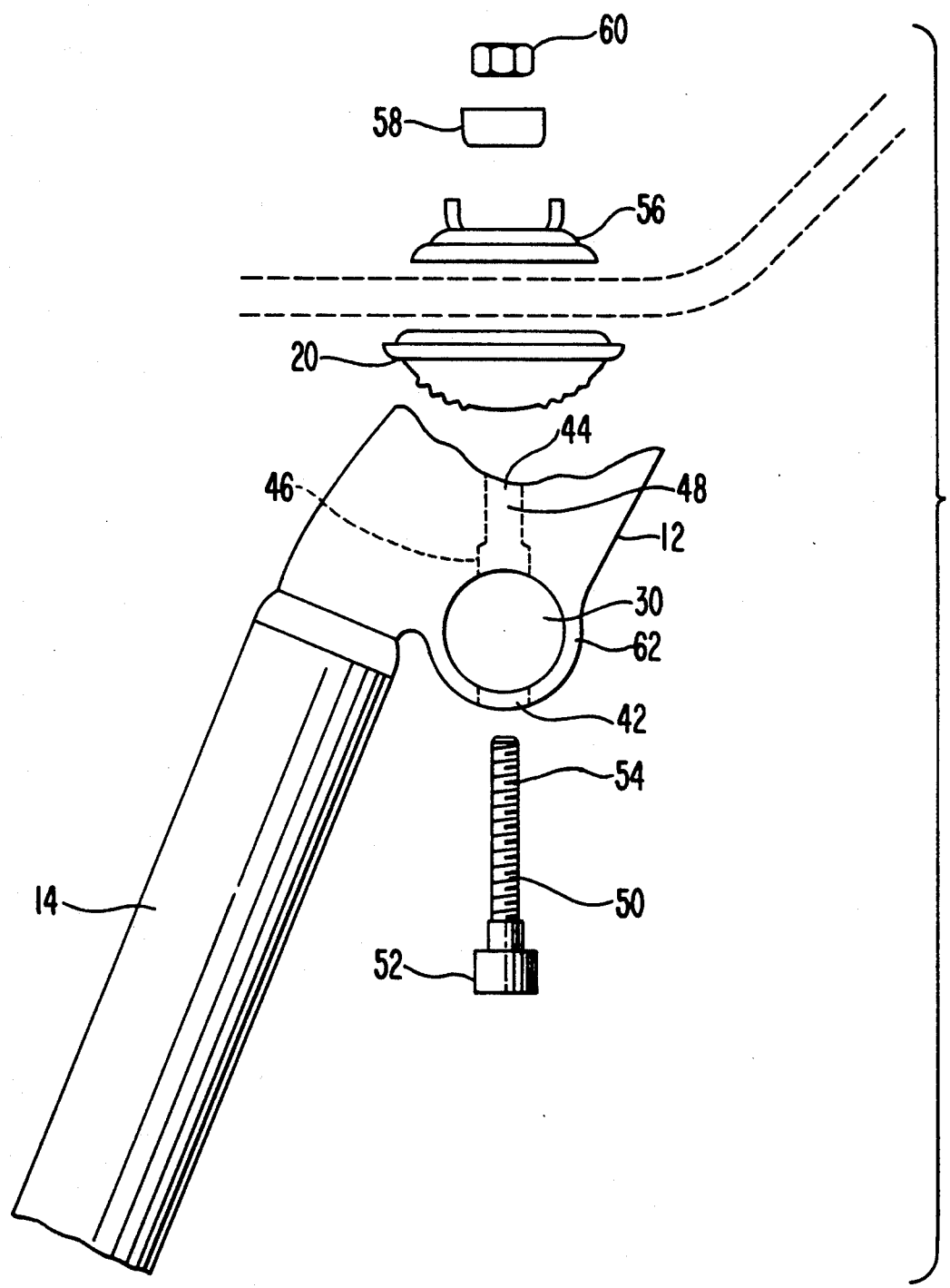
FIG. 4 is a side elevational view of the bicycle seat security device formed as a permanent portion of the seat post of bicycle seat.

A second embodiment of the present invention is illustrated in FIG. 4 wherein it will be noted that the upper support section 12 of the seat post includes an integrally formed lock receiving loop 62. This loop includes the central bore 30 for receiving a hoop lock 26 as well as the fastener receiving opening 42 to permit passage of the retaining bolt 50. However, in this case, since the lock receiving loop cannot be rotated, the fastener receiving housing 32 of FIG. 1 is eliminated. Instead, the enlarged head 52 of the retaining bolt is received within the entrant section 46 of the stepped bore 44 and the shank 54 extends out through the exit section 48. In all other respects, the bicycle seat security device of FIG. 4 operates in the same manner as the device 10 of FIG. 1.

INDUSTRIAL APPLICABILITY

The bicycle seat security device 10 may be formed integrally with the upper support section of a seat post or may be retrofit into existing seat posts. The security device provides a simple and effective means of preventing the theft of bicycle seats while a bicycle is left unattended by the user. Once a conventional bicycle hoop lock is inserted through the device, it is impossible to reach the seat retaining bolt for a bicycle seat assembly, and the bicycle seat can be effectively locked to a stationary support.

I claim:

1. A bicycle seat security device for use in combination with a bicycle lock and a bicycle seat having a seat post, said bicycle seat security device being adapted to receive said bicycle lock for reducing the likelihood of theft of said bicycle seat and comprising:
   (a) a lock receiving means for securing the bicycle seat to the bicycle lock, said lock receiving means operating to removably receive and retain a portion of said bicycle lock; and
   (b) a fastening means for joining said lock receiving means with said bicycle seat, said lock receiving means operating to prevent access to said fastening means when a portion of the bicycle lock has been received by said lock receiving means by positioning and retaining said portion of the bicycle lock in superimposed position over said fastening means.

2. The bicycle seat security device of claim 1, wherein said lock receiving means includes a lock retaining section having a lock bore extending therethrough to receive said bicycle lock portion and mounting means formed on said lock retaining section at one side of said lock bore, said mounting means being operative with said fastening means to mount said lock receiving means on said seat post, said lock retaining section including a fastener receiving opening extending therethrough into said lock bore in opposed, spaced relationship to said mounting means and on an opposite side of said lock bore from said mounting means.

3. A bicycle seat security device for use in combination with a bicycle lock and a bicycle seat having a seat post, said bicycle seat security device being adapted to receive said bicycle lock for reducing the likelihood of theft of said bicycle seat and comprising:

a lock receiving means for securing the bicycle seat to the bicycle lock which operates to removably receive and retain a portion of said bicycle lock, said lock receiving means including a lock retaining section having a lock bore extending therethrough to receive said bicycle lock portion and mounting means formed on said lock retaining section at one side of said lock bore, said mounting means including a fastener receiving housing extending laterally from said lock retaining section, said fastener receiving housing defining an open ended housing bore extending substantially perpendicular to said lock bore and having one end which opens into said lock bore, said lock retaining section including a fastener receiving opening extending therethrough into said lock bore in opposed, spaced relationship to said mounting means, and a fastening means for joining said lock receiving means with said bicycle seat, said lock receiving means operating to prevent access to said fastening means when a portion of the bicycle lock has been received by said lock receiving means, said fastening means being operative with said mounting means to mount said lock receiving means on said seat post.

4. The bicycle seat security device of claim 3 wherein said fastening means includes a seat retaining bolt having an enlarged head and an elongate shank extending from said enlarged head, said fastener receiving opening being of sufficient cross sectional area to permit the passage of said enlarged head therethrough, the enlarged head of said seat retaining bolt being received within said fastener receiving housing and the shank of said retaining bolt passing through said open ended housing bore to mount said lock receiving means on said seat post.

5. A bicycle seat security device for attachment by a fastener to a bicycle seat post and adapted to receive a bicycle lock comprising a lock retaining section having a lock bore extending therethrough to receive said bicycle lock, a fastener receiving opening formed in said lock retaining section and extending therethrough to said lock bore, said fastener receiving opening being sized to permit the passage of said fastener therethrough, and mounting means formed on said lock retaining section on the side of said lock bore opposite to said fastener receiving opening, said mounting means being operative to mount said lock retaining section on said post and defining an open ended bore extending substantially perpendicular to said lock bore and having one end opening into said lock bore opposite to said fastener receiving opening.

6. The bicycle seat security device of claim 5 wherein said mounting means include a fastener receiving housing extending laterally from said lock retaining section and including said open ended bore, said open ended bore being a stepped bore with a first bore section opening at one end into said lock bore and a second bore section extending from said first bore section, said second bore section having a cross sectional area which is less than the cross sectional area of said first bore section.

7. The bicycle seat security device of claim 6 wherein said fastener receiving housing includes a first cylindrical housing section extending from said lock retaining section, said first bore section being included in said first cylindrical housing section, a second cylindrical housing section having a cross sectional area which is less than that of said first housing section, said second bore section being included in said second housing section and a flange joining said first and second housing sections, said lock retaining section being formed by a cylindrical ring defining a circular central lock bore.

8. A bicycle seat assembly including a bicycle seat security device for use in combination with a bicycle lock comprising a bicycle seat, a seat post secured to said bicycle seat for mounting said bicycle seat onto a bicycle frame, said seat post including a bolt receiving bore extending therethrough, and a lock receiving means secured to said seat post to receive and retain a portion of said bicycle lock, said lock receiving means defining a lock bore extending therethrough to receive said bicycle lock, said bolt receiving bore extending substantially perpendicular to said lock bore.

9. The bicycle seat assembly of claim 8 wherein said lock receiving means includes a fastener receiving opening extending into said lock bore in opposed, spaced relationship to said bolt receiving bore.

10. The bicycle seat assembly of claim 9 wherein said lock receiving means is integral with said seat post.

11. The bicycle seat assembly of clam 9 wherein said bolt receiving bore is a stepped bore having an entrant section and an exit section extending from said entrant section of smaller cross sectional area than that of said entrant section.

12. The bicycle seat assembly of claim 11 which includes a seat retaining bolt having an enlarged head and an elongate shank extending from said enlarged head, said fastener receiving opening being of sufficient cross sectional area to permit the passage of said enlarged head therethrough, the shank of said retaining bolt extending through said stepped bore and the enlarged head of said seat retaining bolt being mounted at a side of said lock bore opposite to and in spaced relationship with said fastener receiving opening.

13. The bicycle seat assembly claim 12 wherein said lock receiving means is integral with said seat post, the entrant section of said stepped bore opening into said lock bore.

14. The bicycle seat assembly of clam 13 wherein the enlarged, head of said seat retaining bolt is mounted within the entrant section of said stepped bore.

15. The bicycle seat assembly of claim 12 wherein said lock receiving means includes a lock retaining section including said lock bore and a fastener receiving housing extending laterally from said lock retaining section, said fastener receiving housing defining an open ended housing bore extending substantially perpendicular to said lock bore and having one end which opens into said lock bore, said fastener receiving housing being mounted within said stepped bore.

16. The bicycle seat assembly of claim 15 wherein the entrant section of said stepped bore is cylindrical in shape, said fastener receiving housing including a first cylindrical housing section of slightly less diameter than the diameter of said entrant section, said first cylindrical housing section being mounted in said entrant section.

17. The bicycle seat assembly of claim 16 wherein said fastener receiving housing includes a second cylindrical housing section extending between said first cylindrical housing section and said lock retaining section, said second housing section having a greater cross sectional area than said first cylindrical housing section, the enlarged head of said seat retaining bolt being mounted within said second cylindrical housing section.

18. The bicycle seat assembly of claim 17 wherein said first and second cylindrical housing sections are joined by an intervening flange, said flange being mounted in engagement with said seat post.

* * * * *